United States Patent [19]

Almasi et al.

[11] 3,792,451

[45] Feb. 12, 1974

[54] NON-DESTRUCTIVE SENSING OF VERY SMALL MAGNETIC DOMAINS

[75] Inventors: George S. Almasi, Purdy Station; George E. Keefe, Montrose; Yeong S. Lin, Mt. Kisco, all of N.Y.

[73] Assignee: International Business Machines Corporation, Armonk, N.Y.

[22] Filed: Nov. 16, 1970

[21] Appl. No.: 89,964

[52] U.S. Cl....340/174 EB, 340/174 TF, 340/174 SR

[51] Int. Cl......................... G11c 11/14, G11c 19/00

[58] Field of Search.. 340/174 TF, 174 SR, 174.1 F, 340/174 EB

[56] References Cited

UNITED STATES PATENTS

| | | | |
|---|---|---|---|
| 3,470,546 | 9/1969 | Bobeck | 340/174 TF |
| 3,518,643 | 6/1970 | Perneski | 340/174 TF |
| 3,540,021 | 11/1970 | Bobeck et al. | 340/174 TF |
| 3,543,252 | 11/1970 | Perneski | 340/174 TF |
| 3,493,694 | 2/1970 | Hunt | 340/174.1 F |
| 3,534,347 | 10/1970 | Bobeck | 340/174 TF |
| 3,691,540 | 9/1972 | Almasi et al. | 340/174 TF |
| 3,366,939 | 1/1968 | Chaptal De Chanteloup | 340/174 EB |
| 3,609,720 | 9/1971 | Strauss | 340/174 TF |
| 3,109,985 | 11/1963 | Kallmann | 340/174 EB |

OTHER PUBLICATIONS

Bell Laboratories Record, "The Magnetic Bubble" by Bobeck, July 1970, pages 163–169.

*Primary Examiner*—Stanley M. Urynowicz, Jr.
*Attorney, Agent, or Firm*—Jackson E. Stanland

[57] ABSTRACT

A magneto-resistive sensing technique for detection of very small single-wall magnetic domains. An apparatus is provided in which magneto-resistive sensing elements are located on a magnetic material capable of supporting single-wall magnetic domains (bubble domains). Since very small bubble domains have only small amounts of magnetic flux associated with them, a transverse magnetic bias field is used to move the operation of each sensing element into a linear region to maximize the sensor's incremental resistance change for a given change in flux. This transverse bias field is derived from the applied magnetic field used to propagate the bubble domains or from the stabilizing field used to stabilize the domains, thereby eliminating the need for an auxiliary bias field. In order to use the applied propagation and bias fields, the sensing elements are precisely located with respect to the propagation means, and have particular orientations.

6 Claims, 13 Drawing Figures

SENSOR AND DOMAIN (FOR FIG. 2A)

INVENTORS
GEORGE S. ALMASI
GEORGE E. KEEFE
YEONG S. LIN

BY J. E. [signature]
AGENT

NON-DESTRUCTIVE SENSING OF VERY SMALL MAGNETIC DOMAINS

CROSS-REFERENCE TO RELATED APPLICATIONS

Application Ser. No. 78,531, filed Oct. 6, 1970 now U.S. Pat. No. 3,691,540, and assigned to the same assignee as the present invention, describes magneto-resistive sensing of single-wall cylindrical magnetic domains by an integrated structure in which the magneto-resistive sensing element can be part of the propagation means.

BACKGROUND OF THE INVENTION

1. Field of the Invention

This invention relates to improved magneto-resistive sensing techniques for cylindrical magnetic bubble domains in which a transverse bias field for the sensing element is derived from the applied propagation and stabilizing fields.

2. Description of the Prior Art

Cylindrical magnetic domains exist in certain magnetic media, such as orthoferrites, and are stabilized by a stabilizing magnetic field applied normal to the magnetic medium. The domains can be propagated to desired locations in the medium by various means, including conductor and/or permalloy overlays.

As noted in the above-mentioned application, various techniques are known for sensing cylindrical magnetic bubble domains. However, none of these techniques is particularly well suited to sensing very small bubble domains. As the size of the bubble domain decreases, the magnetic flux associated with it decreases and the detection means must increase in sensitivity in order to be able to adequately detect the bubble domains.

All of the previously known techniques for sensing bubble domains have disadvantages when the size of the domain is decreased. Because it is desirable to make the bubble domains as small as possible to increase bit density in practical devices, it is very important to provide adequate means for non-destructively sensing very small bubble domans.

As an example of the disadvantages of prior systems for sensing small domains, the inductive sensing technique generally relies on a first expansion of the bubble domain before collapsing it and sensing the time derivative of the flux associated with the domain. Although this may provide an adequate output signal, it is time consuming and requires additional space on the magnetic sheet which could be used for other functions. In addition, it requires drive currents to cause the bubble domain to expand before collapsing.

Magneto-optic sensing techniques require very small light beams as the size of the bubble domain decreases, since it is inefficient to have the size of the light beam greater than the bubble domain size. However, as the bubble domains decrease to less than one mil in diameter, it is difficult to provide small light beams which would be suitable.

As described in the above-cited application Ser. No. 78,531, magneto-resistive sensing provides a very good means for detecting bubble domains. In that application, various embodiments are shown in which the magneto-resistive sensing element is a portion of the actual propagation means, thereby providing an integrated structure which is easily fabricated. In magneto-resistive sensing systems, it is generally desirable that the sensing elements have a length in the direction of the measuring current which is approximately equal to the bubble domain diameter. This insures that the bubble domain will have a maximum effect in rotating the magnetization vector of the sensing element. However, as the sensing element decreases in size, its demagnetizing field increases and shape anisotropy of the element becomes important. As an example, 200A is the thinnest permalloy film that can be used as a detector. This means that a higher magnetic field intensity is required to rotate the magnetization of the sensing element. The maximum driving field is $4\pi M_s$ ($M_s$ is the saturation magnetization of the sensing element), but it exists only over an infinitesimally small volume. The effective driving field available from a bubble domain depends on the size of the sensor, but a typical value might be $0.2(4\pi M_s)$, i.e., 20–40 Oe, for a sensor whose width is equal to the bubble domain radius. This remains true as the bubble domain is decreased in size. However, the demagnetizing field of the sensor increases in inverse proportion to its width. Therefore, small bubble domains are not adequately detected by this type of sensor.

One way to increase the sensitivity of magneto-resistive sensing elements to small magnetic fields is to provide a transverse magnetic bias field across the sensing element. This has been previously taught in U. S. Pat. No. 3,493,694. To provide such a transverse bias field, an external magnetic field is applied across the sensing element. This moves the operation of the sensing element into a more linear region, so that a smaller magnetic field intensity from a bubble domain will cause a larger change in the resistance of the sensing element.

In a bubble domain system, it is very important that devices be kept small and that additional magnetic fields not be required. Such fields require additional driving currents and therefore increase the power requirements of the apparatus. Although magneto-resistive sensing techniques for bubble domains offer promise of integrated systems, it has not heretofore been suggested how to apply this type of sensing to the detection of very small bubble domains. Accordingly, it is a primary object of this invention to provide magneto-resistive sensing techniques for detection of very small magnetic bubble domains.

It is another object of this invention to provide magneto-resistive sensing of very small bubble domains by a sensing system that is integrated on the magnetic sheet in which domains are propagated.

It is still another object of this invention to provide magneto-resistive sensing techniques for bubble domain devices in which magnetic fields already present in the devices are used as transverse bias fields.

It is a further object of this invention to provide sensing techniques for bubble domains in which the detection means and the propagation means can be of the same thickness regardless of bubble domain size, thereby simplifying fabrication.

SUMMARY OF THE INVENTION

A magnetic medium capable of supporting bubble domains is provided. Located on this medium are means to propagate the bubbles to selected locations in the magnetic medium, as well as magneto-resistive sensing means used to detect the bubbles.

The sensing means comprises a magneto-resistive sensing element located on the magnetic medium. In most cases, the sensing element is located on same side of the magnetic medium as the propagation means, although this is not an absolute requirement. The stray magnetic field of the bubble domain rotates the magnetization vector of the sensing element, thereby changing the resistance of this element. If a constant current source is connected across the sensing element, changes in the resistance of the sensing element can be detected as voltage changes across the element. This is the general scheme set forth in the afore-mentioned application Ser. No. 78,531.

In this apparatus, the magneto-resistive sensing element is precisely located with respect to the propagation means such that the propagation field or stabilizing field in the plane of rotation of the magnetization vector is substantially perpendicular to the measuring current direction through the sensing element at the instant the bubble domain is to be sensed. That is, the propagation field or stabilizing field has a component transverse to the sensing element which serves as a bias on this element when the bubble domain is to be sensed. This eliminates the requirement for an externally applied transverse bias and therefore simplifies the sensing system. Further, any size bubble can be sensed by this means, and the sensing element thickness can be the same as that of the propagation means, thereby simplifying fabrication.

In the case of a permalloy T and I bar propagation means, the magneto-resistive sensing element is conveniently permalloy and forms a portion of the actual propagation means. This provides an integrated structure which is easy to fabricate. The leads connecting the constant current source to the sensing element are fabricated on the T and I bars. The sensing element is located on one leg of the horizontal portion of the T-bars and will experience a transverse magnetic field when the bubble domains travel under this horizontal portion.

In the case of a herringbone permalloy propagation means, the magneto-resistive sensing element is also permalloy. It is located close to the herringbone pattern, and experiences a transverse bias from the stabilizing bias field across the magnetic medium. The transverse bias is normal to the direction of measuring current through the sensing element. In this embodiment the plane of the sensing element is normal to the plane of the magnetic medium, i.e., it is mounted vertically.

In the case of a conductor loop propagation means, the magneto-resistive sensing elements are located either within the conductor loops or outside these loops. The measuring current through each sensing element is along the direction of propagation of the bubble domains, in the preferred embodiments. If located within a conductor loop, the sensing element is mounted vertically and the normal component of the magnetic field produced by current in the conductor loops is used to provide a transverse bias across the sensing element. In this arrangement, the stabilizing field also provides a transverse component for bias. If the sensing element is located outside the conductor loops, the propagation field produced by current in the loops provides a transverse bias, in addition to that provided by the stabilizing field across the magnetic medium.

For an angelfish propagation means, the magneto-resistive sensing element is preferably located adjacent the permalloy wedges which comprise the propagation means. As in the case of a conductor loop propagation means, the sensing element is vertically mounted on the magnetic medium and the direction of measuring current through the element is parallel to the direction of propagation of bubble domains. The modulated magnetic field which is used for bubble domain propagation is used for transverse bias during sensing.

The magneto-resistive sensing element is a uniaxial film which can be selected from any magneto-resistive material. Since permalloy is often used as a propagation means, selection of permalloy provides compatible fabrication steps. Further, the sensing element need not be a single crystal. The measuring current through the element is generally directed along the easy axis of the element, and the element has a length in the direction of the easy axis greater than its direction normal to this axis. The length of the sensing element in the direction of the measuring current is chosen to be approximately the diameter of the bubble domain. The width of the element determines its demagnetizing field, which is also proportional to the thickness of the element. In general, permalloy sensing elements cannot be less than 200A thick or the demagnetizing field of the element will be too large for efficient detection of bubble domains. The requirements of the sensing element are the same as those set forth in the afore-mentioned copending application Ser. No. 78,531.

The foregoing and other objects, features, and advantages of the invention will be apparent from the following more particular description of the preferred embodiments of the invention as illustrated in the accompanying drawings.

DESCRIPTION OF THE PREFERRED EMBODIMENTS

Figure 1:
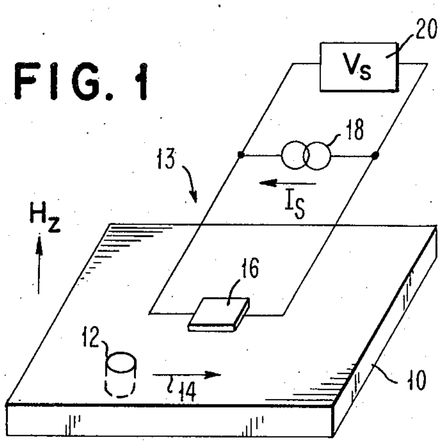
FIG. 1 is a conceptual illustration of a magneto-resistive sensing system for detection of bubble domains propagating in a magnetic medium.

Although the co-pending application Ser. No. 78,531 also describes the propagation of bubble domains in a magnetic medium, FIG. 1 illustrates conceptually the use of a magneto-resistive sensing element on a magnetic sheet in which the bubble domains propagate. Subsequent figures will use the reference numerals of FIG. 1 whenever possible to facilitate clarity and understanding. In more detail, a magnetic sheet 10 contains single-wall magnetic bubble domains 12 which can be selectively moved in the medium by a conventional propagation means not shown in this figure. Assuming that propagation is in the direction of the arrow 14, the bubble domains will move past a magneto-resistive sensing system 13.

The sensing system comprises the magneto-resistive sensing element 16, a current source 18, and a voltage measuring device 20. The sensing element 16 can be any material which is magneto-resistive, permalloy being a good example. Current source 18 provides a measuring current through the magneto-resistive sensing element. When the bubble domain is in proximity to the sensing element, the stray magnetic field of the bubble domain will intercept the sensing element and will cause the magnetization vector of this element to rotate. This produces a resistance change in sensing element 16 which is ultimately detected as a signal voltage $V_s$ by detection means 20. Although current source 18 need not provide a constant current, such a current is preferable when voltage changes are to be detected. As is apparent, this invention is concerned with an improved magneto-resistive sensing technique in which the sensing element is located on the magnetic sheet in such a way that the propagation magnetic fields for moving the bubble domains and/or the normal bias field for bubble domain stability will serve as transverse bias fields across the sensing element, thereby making it more sensitive to detection of very small magnetic fields.

Figure 2A:
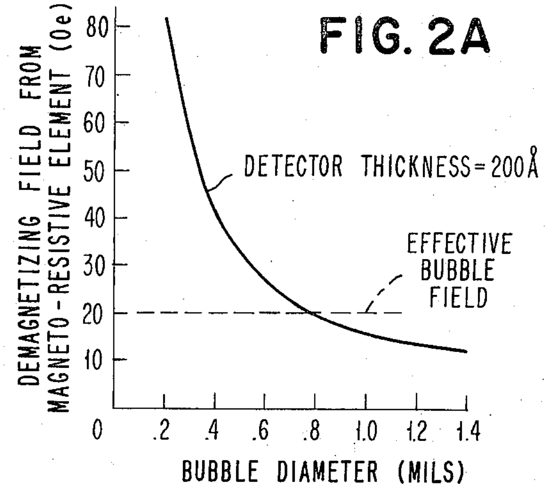
FIG. 2A is a graph of the demagnetizing field associated with the sensing element of FIG. 2B (whose width equals the bubble radius), plotted against the bubble domain diameter.
Figure 2B:
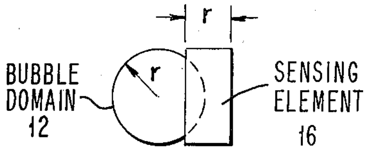
FIG. 2B is an illustration of a bubble domain passing a magneto-resistive sensing element whose width is approximately the bubble domain radius and whose length is approximately the bubble domain diameter.

FIG. 2A is a plot of the demagnetizing field for the magneto-resistive sensing element 16, plotted against the bubble domain diameter. The width of the sensing element is assumed to be half the bubble diameter. This figure illustrates the large increase in demagnetizing field of the element as the bubble domain diameter decreases (it is assumed that the sensing element has a length approximately equal to the domain diameter). The location of the bubble domain with respect to the sensing element is shown in FIG. 2B, and it is to be noted that most of the magnetic flux from the bubble domain emanates from the edge of the domain. Therefore, the sensing element is located off-center with respect to the direction of travel of the bubble domains, so that a maximum magnetic flux will intercept the sensing elements.

Figure 3:
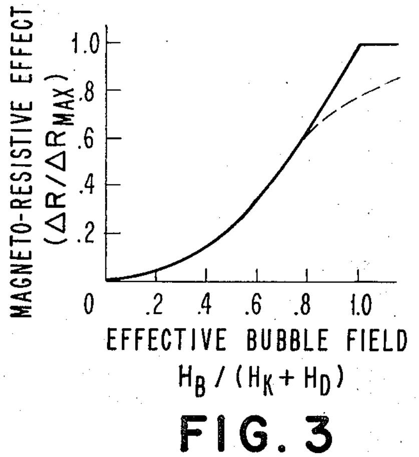
FIG. 3 is a graphical plot of the magneto-resistive effect as a function of the bubble domain field.

From FIG. 3, it is apparent that the magneto-resistive effect is not linear, while from FIG. 2A it is apparent that the demagnetizing field associated with a sensing element increases rapidly as the bubble domain diameter decreases. In FIG. 2A, the assumed length of the sensing element in the direction of the measuring current therethrough is approximately equal to the bubble domain diameter and that its width is half this amount. It is assumed that all proportions are maintained when the bubble domain diameter is decreased, for purposes of this explanation. This means that the sensing element width decreases as the diameter of the bubble domains decreases. As an illustration, a bubble domain baving a diameter 0.4 mil is generally sensed by an element 16 having a width approximately 0.2 mil. From FIG. 2A, the demagnetizing field of sensing element 16 for a bubble diameter 0.4 mil is around 40 oersteds, assuming a sensing element thickness of 200 angstroms. However, the effective driving field available from a bubble domain will remain approximately constant at $0.2(4\pi M_s)$ where $M_s$ is the saturation magnetization of the medium 10 in which the bubble domain is traveling. Typically, the effective field is about 20 oersteds, for orthoferrite materials, as is illustrated by the dashed horizontal line labeled "effective domain field" in FIG. 2A.

In FIG. 3, the magneto-resistive effect, normalized to unity at its maximum value, is plotted as a function of the domain magnetic field $H_B$, normalized against the field required to saturate the sensing element. Here, $H_s$ is the saturation magnetic field of the sensing element, $H_D$ is the demagnetizing field of the sensing element and $H_k$ is the anisotropy field of the sensing element. For example, in the case of FIG. 3, $H_s = H_D + H_k$. If the bubble domain field $H_B$ is 20 oersteds and the demagnetizing field of a sensing element 16 is approximately 40 oersteds (before saturation of the element occurs), the ratio $H_B/H_s$ is about 20/40, or 0.5.

It can be shown that the change in resistance $\Delta R$ of the sensing element when a bubble domain passes, in relation to the maximum change in resistance $\Delta R_{max}$ of the sensing element is given by $$(\Delta R/\Delta R_{max}) = (H_B/H_s)^2 \; [1 + 2 \; (H_{BIAS}/H_B)] \text{ for} \quad (1)$$

$$H_B + H_{BIAS} < H_s \quad (2)$$

where:

$H_B$ is the stray magnetic field of the bubble domain;

$H_s$ is the saturation magnetic field of the sensing element;

$H_{BIAS}$ is the transverse bias magnetic field across the sensing element.

It can be seen that the bias is particularly beneficial for $H_B << H_s$. Theoretically, equation 1 shows that $H_{BIAS}$ should be as large as possible so long as it is consistent with equation 2. Experimentally, the maximum value of $\Delta R/\Delta R_{max}$ may occur for a somewhat smaller value of $H_{BIAS}$. This is because experimentally the approach to saturation is often more gradual than that predicted by the analysis leading to equation 1. That is, for a field $H_y$ in the hard axis direction less than about $0.7(H_k + H_D)$, where $H_D$ is related to the thickness $t$ and width $w$ of the sensing element by $H_D = (4\pi M_s)\ t/w$, the solid curve of FIG. 3 is followed. As $H_y$ approaches $H_k + (4\pi M_s)\ t/w$, it becomes increasingly difficult to saturate the sensing element, and actual saturation occurs for $H_y$ two to three times greater than $H_k + (4\pi M_s)\ t/w$. This is because the demagnetizing field $H_D = t/w(4\pi M_s)$ is calculated assuming an elliptical cross-section for the sensing element, whereas the actual cross-section is rectangular. In FIG. 3, the dashed line indicates the gradual approach to saturation which has been experimentally observed. Nevertheless, even if $H_{BIAS}$ is only 0.5 $H_s$, where $H_s = H_k + (4\pi M_s)\ t/w$, equation 1 becomes $$(\Delta R/\Delta R_{max}) = (H_B/H_s)^2\ [1 + (H_s/H_B)\ ] \qquad (3)$$

If $H_B$ is, say, 0.25 $H_s$, the theoretical model holds reasonably well and the bias field will enhance the signal five-fold.

Preferably, the bias field should be on the order of the bubble domain field. The sensing system is designed with respect to the sensing element material, the magnetic medium in which the domains travel, etc., and the bias field is established to give a maximum signal. For maximum signal $H_s = H_{BIAS} + H_B$, so the optimum bias field is $H_{BIAS} = H_s - H_B$. As a lower limit, any bias field will aid the detection of small bubbles and the bias field is chosen so that $\Delta R/\Delta R_{max}$ will provide usable output voltage. This may involve careful selection of the magnitude of the measuring current, and providing adequate heat dissipation for the sensing element, etc. These considerations will be readily apparent to one of skill in the art, given the relationships expressed herein.

Figure 4A:
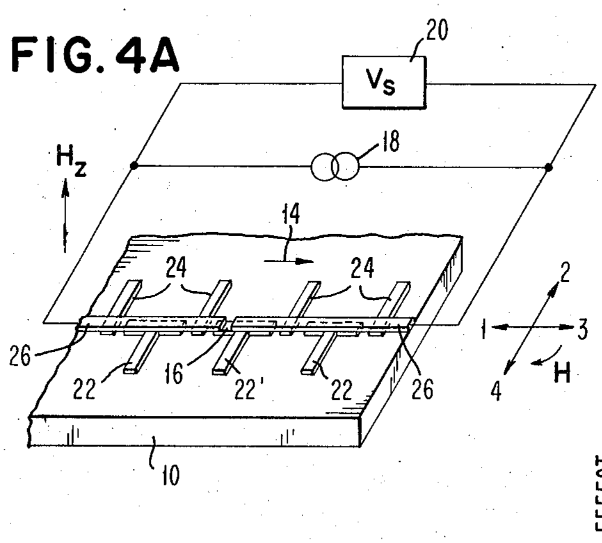
FIG. 4A is an illustration of a T and I bar propagation means having a sensing element located within the propagation means, which is suitable for detection of bubbles which are very small.

In FIG. 4A, a permalloy T and I bar overlay has been deposited on a magnetic sheet 10. This overlay is comprised of conventional T bars 22 and I bars 24. Located in a portion of T bar 22' and integral therewith is the magneto-resistive sensing element 16. As will become apparent, this element is so located in the propagation means (T-bar 22') that it will experience a transverse bias field from the rotating propagation magnetic field H when the bubble domain 12 passes beneath element 16. The sensing element is connected to a current source, such as constant current source 18, and to a voltage measuring device 20 which indicates the voltage $V_s$ across the sensing element The operation of the sensing system 13 is the same as that described with reference to FIG. 1.

Under the influence of the rotating magnetic field H, the bubble domain will move in the direction of the arrow 14 across magnetic sheet 10. Movement in this way is well understood in the art, and reference is made to the aforesaid co-pending application Ser. No. 78,531 for more detail.

The integrated structure of FIG. 4A is similar to that described in co-pending application Ser. No. 78,531, in that the magneto-resistive sensing element 16 is integrated as a portion of the propagation means. Conductors 26 overlie the permalloy T and I bars and connect sensing element 16 to current source 18. The resistance of conductors 26 is much less than that of the underlying permalloy bars, so they electrically shunt the underlying permalloy elements. A fabrication procedure for the structure of FIG. 4A uses standard photolithographic techniques and is described in more detail in co-pending application Ser. No. 78,531.

Figure 4B:
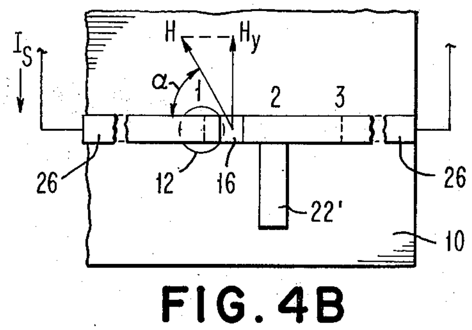
FIG. 4B is an enlarged view of a portion of the circuitry of FIG. 4A, in which the sensing element and the magnetic field across it are shown in more detail.

In FIG. 4B, T bar 22' is shown separated from the rest of the structure to illustrate the creation of a transverse bias field across sensing element 16 while the bubble domains move by this sensing element. Assuming a bubble domain 12 initially located at position 1 on T-bar 22' while the propagation field is initially in direction 1, domain 12 will begin its movement to the right toward position 2 as soon as propagation field H rotates away from direction 1. The initial speed of domain 12 is small because the initial strength of the magnetic pole at position 2 is quite small compared to the strength of the pole at position 1. A symmetry argument can be used to show that no matter how slowly the propagation field H is rotating, the domain 12 will not reach a position midway between positions 1 and 2 until the propagation field $H$ is at an angle $\alpha$ which is at least 45° with respect to the direction of its rotation. Thus, if sensing element 16 is halfway between points 1 and 2, a substantial transverse magnetic bias field (between 0.71 $|H|$ and $|H|$) will exist across element 16 at the time that domain 12 passes underneath it. This transverse bias field will move the operation of sensing element 16 into a linear region where the magnetic field of the bubble domain will cause a larger rotation in the magnetization of element 16 that if the transverse bias field were not present. Consequently, the resistance of element 16 will be changed by a larger amount, and a correspondingly larger signal voltage $V_s$ will develop.

In FIG. 4B, the sensing element 16 is shown located approximately half-way between pole positions 1 and 2 of T-bar 22'. As the sensing element is moved closer to pole position 2, its demagnetizing field will decrease due to the influence of the vertical leg of T bar 22', and the likelihood of saturating the sensing element before the bubble domain arrives will also increase. On the other hand, if the sensing element is placed too close to position 1, the bubble domain will begin its movement from position 1 to position 2 before a substantial transverse bias has developed across sensing element 16, i.e., there will be only a small transverse bias across the element when the bubble domain passes thereby reducing the rotational capabilities of the bubble domain. In general, a range of about one-quarter of the distance between position 1 and position 2 to three-quarters of this distance is preferable for placement of sensing element 16. Stated in another way, it is desirable to locate element 16 so that the transverse bias across it during sensing is that which has been previously expressed.

Of course, for bubble domain travel in the direction of arrow 14, sensing element 16 cannot be placed on the right-hand portion of the horizontal leg of the T-bar, i.e., between pole positions 2 and 3. This is because the transverse bias across sensing element 16 will be minimal while the bubble domain is traveling from position 2 to position 3 if the element 16 is located between positions 2 and 3. This is explained more fully with respect to FIG. 4C.

Figure 4C:
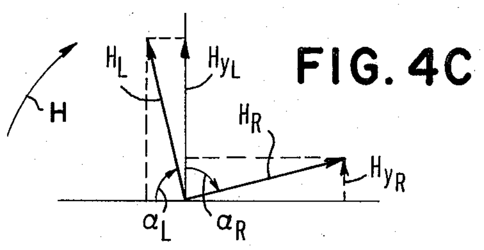
FIG. 4C is a vector diagram of the magnetic field components across the sensing element for two locations of the sensing element on the T bar propagation element.

In FIG. 4C, the components of magnetic bias across element 16 are shown for two locations of element 16 on T bar 22'. The first location is that of FIG. 4B, i.e., between pole positions 1 and 2. Since this is to the left of the vertical leg of T bar 22', it will be denoted by subscript L. Consequently, the magnetic bias on element 16 from the propagation field H is designated $H_L$ when the bubble domain is half-way between pole position 1 and pole position 2. This corresponds to $\alpha_L > 45°$. The second location of element 16 is to the right of the vertical leg of T bar 22', i.e., between pole positions 2 and 3. This location is denoted by the subscript R. Consequently, the magnetic bias of propagation field H on the element 16 when $\alpha_R > 45°$ and element 16 is located between pole positions 2 and 3 is $H_R$.

As is apparent from FIG. 4C, the vertical (transverse) component ($H_y$) of $H$ when the bubble domain is under the sensor is greater when element 16 is located between pole positions 1 and 2, rather than between pole positions 2 and 3. That is, $H_{y_L} > H_{y_R}$, for bubble domain movement in the direction of arrow 14. Of course, if bubble domain movement were in the opposite direction, then it would be preferrable to locate sensing element 16 between pole positions 2 and 3.

As an example of a suitable magneto-resistive sensor, a permalloy element located on a $TmFeO_3$ platelet 56 $\mu$m thick will provide a 3.5mV signal in the presence of a 30 Oe. transverse bias field. The sensing element resistance was 52 ohms, the measuring current was 7mA; and the sensing dimensions were about 250A × 38$\mu$m × 138$\mu$m, while the bubble domain diameters were approximately 140$\mu$m. The response of the sensing element is approximately constant up to at least 30 MHz, well beyond the maximum data rate allowed by the bubble domain mobility. It should be noted that the components of the propagation and/or bias field and the bubble domain field which rotate the magnetization vector of the sensing element are in the plane of rotation of this vector. Further, the transverse bias field supplied to give linear operation should be at least about one quarter of the saturating field of the sensing element in order to obtain sufficient output signals when the bubble domain is sensed.

The transverse bias required depends primarily on the width of the sensing element, since the bubble domain flux remains constant at approximately $0.2(4\pi M_s)$. The relationship between transverse bias, bubble domain size, and sensing element dimensions should be as follows:

The width of the sensing element should be less than the bubble domain diamter. However, the sensor cannot be thinner than 200A because the ratio $\Delta R_m/R_o$ of available resistance change to total resistance decreases sharply for permalloy films thinner than 200A. Hence, if sensor thickness remains constant while bubble diameter decreases, sensor demagnetizing field increases. The effective driving field from the bubble remains an appromately constant fraction of $4\pi M_s$, typically $0.2(4\pi M_s)$, and $4\pi M_s$ is typically 100 Oe. for orthoferrites and 200 Oe. for garnets. Thus, as bubble diamter is decreased, the sensor demagnetizing field will eventually exceed the driving field available from the bubble. At this point, the transverse bias field should be chosen to maximize the incremental resistance change caused by the bubble. In theory, this is achieved by choosing $H_{BIAS} = H_s - H_B$, where $H_s$ is the field required to saturate the sensor and is theoretically equal to the sum of the sensor's anisotropy field $H_k$ and demagnetizing field $H_D = t/w(4\pi M_s)$, $t$ being sensor thickness and $w$ the sensor width (See FIG. 3). Experimentally, the approach to saturation is often gradual as indicated by the dashed line in FIG. 3, and may have to be determined empirically. In this case the optimum bias field will be somewhat less than $H_2 - H_B$; however, even operation at $H_{BIAS} = 0.5\ H_s$ still enhances the magneto-resistive signal by a factor $(1 + 2\ H_{BIAS}/H_B) = (1 + H_s/H_B)$.

Figure 5A:
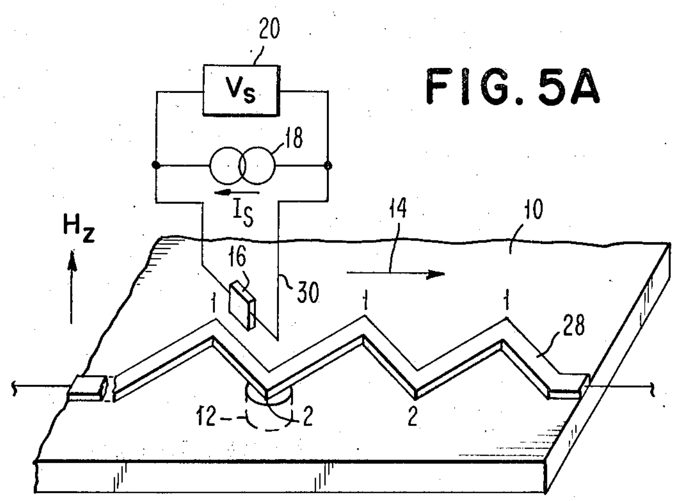
FIG. 5A is a diagram of a bubble domain system using a magnetic zig-zag pattern and a magneto-resistive sensing element for detection of very small bubble domains.

In FIG. 5A, a herringbone permalloy pattern is used to propagate bubble domains 12 in the direction of the arrow 14. In this structure, there is a zig-zag permalloy pattern 28 deposited on magnetic medium 10. Conductor patterns 30 connect sensing element 16 to current source 18 and voltage measuring device 20, in a manner similar to that with respect to FIG. 4A. The plane of the sensing element 16 is normal to the plane of magnetic medium 10, i.e., it is mounted vertically on medium 10. Its normal direction of magnetization is in the direction of measuring current $I_s$ through it.

Figure 5B:
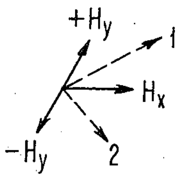
FIG. 5B is a diagram of the applied magnetic fields used to propagate bubble domains with the structure shown in FIG. 5A.

Under the influence of an applied magnetic field along directions 1 and 2 (FIG. 5B), the bubble domains 12 propagate in the direction of arrow 14. The applied propagation fields are a D.C. magnetic field applied in the positive X direction ($H_x$) and a pulsating magnetic field applied in the Y direction. In the positive Y direction this is $+H_y$ and in the minus Y direction this is $-H_y$. These fields are produced by coils external to the magnetic sheet 10, in a conventional manner. The resultant drive fields are magnetic fields which alternately exist in the directions 1 and 2.

Figure 6A:
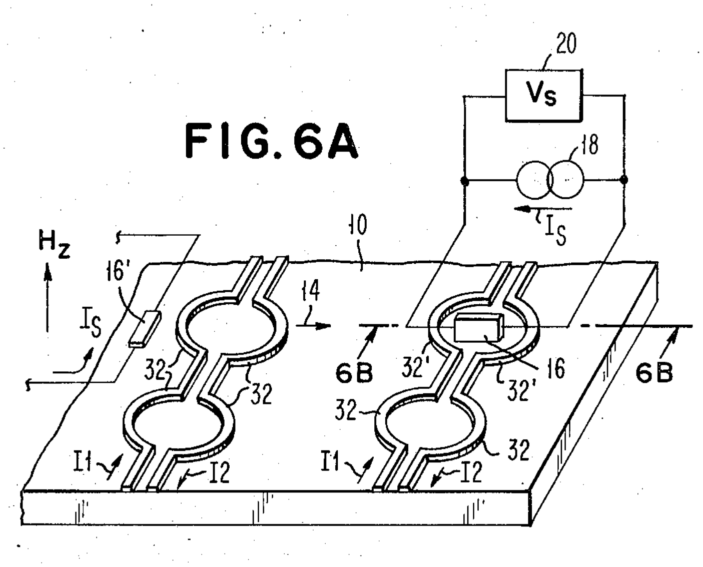
FIG. 6A is a bubble domain apparatus in which conductor loops are used to propagate the bubble domains, and magneto-resistive sensing elements are located within the propagation loops and outside these loops, the magnetic field produced by the propagation loops being used as the transverse bias field for the sensing elements.

FIG. 6A shows a bubble domain apparatus in which conductor loops 32 are used to propagate bubble domains in the direction of arrow 14. These conductor loops can be deposited directly on magnetic sheet 10 in a manner which is well known. When currents $I_1$, $I_2$ flow through the loops, magnetic fields having a vertical component are established which attract the bubble domain from one loop to the next (in the direction of arrow 14).

Located within a loop at a position where it is desired to detect bubble domains in a magneto-resistive sensing element 16. This element has its plane normal to the surface of magnetic sheet 10 and its magnetization vector M is usually along the direction of movement of the bubble domains. Connected to element 16 is a current source 18 and a voltage measuring device 20. These elements are the same as that described previously.

An in-plane sensing element 16' is also located on medium 10. Element 16' is also connected to a current source and a detector (not shown), as is the case for element 16. The easy axis of element 16' is in the direction of measuring current $I_s$ through element 16'.

Figure 6B:
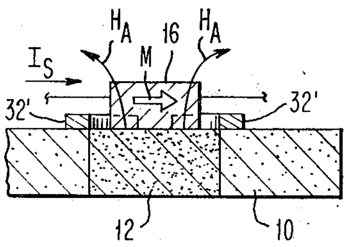
FIG. 6B is a cross-sectional view of the structure of FIG. 6A along line 6B—6B, showing a sensing element and the applied propagation fields.

In FIG. 6B, an enlarged side elevational view is shown of the magnetic sheet 10 and conductor loop 32', in which exists the sensing element 16. As will be apparent from this figure, a vertical component of the magnetic field line $H_A$ produced by conductor loop 32' exists across the sensing element 16. Therefore, the propagation field $H_A$ provides a transverse bias across sensing element 16 when bubble domain 12 passes under element 16. Because element 16 has been biased into a linear region of operation by the transverse component of $H_A$, the magnetic flux associated with a very small bubble domain 12 will be sufficient to rotate the magnetization M of element 16 when the bubble domain passes beneath this element. In FIG. 6B, the stabilizing field $H_z$ is also a transverse bias for element 16, and the total bias field plus the domain field must be less than the saturation field of element 16.

In this embodiment, as well as in the other embodiments, the measuring current $I_s$ is normally along the direction of magnetization of sensing element 16, i.e., along the easy axis before being rotated by the domain field.

Element 16' is located outside the conductor loops and will experience a horizontal component (in-plane) of the magnetic field produced by current $I_1$ through the lefthand portion of loop 32. Current $I_2$ in the right-hand portion of this loop produces a field which doesn't affect the sensing element 16', because the element is distant from this portion of the loop. The horizontal component of magnetic field is a transverse bias on the sensing element 16'. If desired, the sensing element could be located on a conductor, but insulated from it.

Figure 7A:
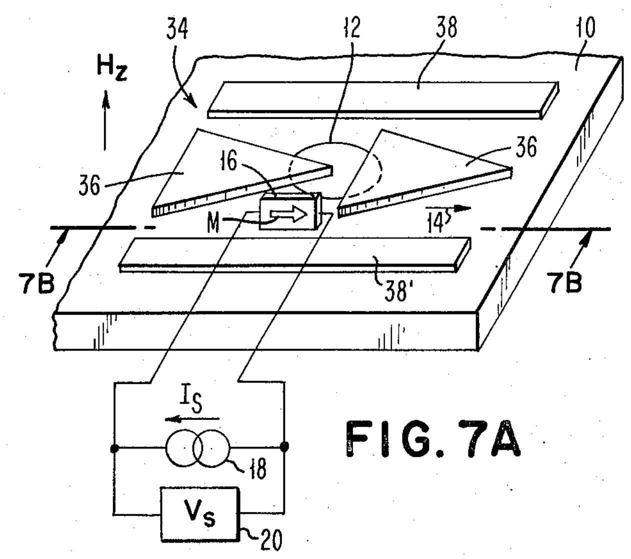
FIG. 7A is a bubble domain apparatus in which angelfish circuitry is used as a propagation means and a magneto-resistive sensing element is located with respect to this propagation means to provide detection of bubble domains of any size.

In FIG. 7A, an angelfish propagation means 34 is located on magnetic sheet 10. This propagation means comprises permalloy wedges 36 and permalloy guide rails 38, both of which are well known. Also located on magnetic sheet 10 is a magneto-resistive sensing element 16 whose plane is normal to the surface of sheet 10, in the manner shown in FIG. 6A. This sensing element is connected to a current source 18 and a voltage measuring device 20. Current source 18 provides measuring current $I_s$ through the sensing element in the direction of magnetization M of the sensing element.

Bubble domain propagation in the direction of arrow 14 occurs by providing a modulated bias field $H_z$ across magnetic sheet 10. This causes alternate expansions and contractions of bubble domains 12, caUsing them to move from one permalloy wedge to another. In this embodiment, the vertical bias field $H_z$, which is also the propagation field, is normal to the direction of magnetization of sensing element 16. Therefore, it will provide a transverse bias field across this element when the bubble domain is passing under the element. This will enable sensing element 16 to detect the presence and absence of bubble domains 12.

Figure 7B:
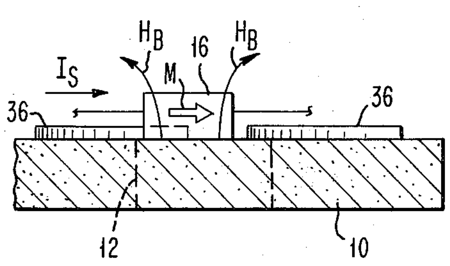
FIG. 7B is a cross-sectional view of the structure of FIG. 7A along line 7B—7B showing the sensing element and the bubble domain field.

In FIG. 7B, a partial cross-section of the magnetic sheet 10 is shown. Sensing element 16 is located approximately between permalloy wedges 36 and is disposed toward quide rail 38'. Sensing element 16 could be located equi-distant between guide rails 38 and 38' and still work in the same manner. However, since most of the magnetic flux emanating from a bubble domain is from the edge of the domain, sensing element 16 has been displaced toward guide rail 38'. It could, of course, be displaced toward guide rail 38 as well.

The normal magnetic field $H_z$ is a bias for sensing element 16, so that the transverse (vertical) component of bubble domain field $H_B$ will be sufficient to rotate the magnetization of element 16, thereby providing a maximum resistance change $\Delta R$.

In all the embodiments shown, a magneto-resistive sensing element is positioned with respect to a propagation means with an orientation such that the magnetic field associated with the propagation means and/or with the normal stabilizing field will exert a transverse component across the sensing element while the bubble domain is passing the element. This transverse component will provide a bias field that moves the magneto-resistive effect of the sensing element into a more linear region of operation so that the small field associated with a bubble domain will result in an increased resistance change in the element. Since it is most desirable to make the dimensions of the magneto-resistive sensing element less than the diameter of the bubble domains, this invention has great practical utility as a detection means for very small bubble domains.

What is claimed is:

1. An apparatus for cylindrical magnetic domains, comprising:

a magnetic medium, said domains being able to propagate in said medium and having a stray magnetic field $H_B$ associated therewith;

propagation means for moving said domains in said medium, said propagation means producing a reorienting propagation magnetic field; and magneto-resistive sensing means for sensing a component of said field $H_B$ of said domains, said sensing means having a resistance which depends upon the presence and absence of said domains in flux-coupling relationship to said sensing means, wherein said sensing means is in flux-linking relationship with a component $H_{BIAS}$ of said propagation field which moves the operation of the sensing element into a linear region and . is directed substantially parallel to said component of $H_B$ which is sensed when said domains are in flux-linking relationship with said sensing means, said sensing means having a saturation magnetic fields $H_s$ and a resistance dependent upon the flux linking said sensing means, wherein the resistance change $\Delta R$ of said sensing means is defined by the relationship $\Delta R/\Delta R_{max}=(H_B/H_s)^2(1+2H_{BIAS}/H_B)$ where $H_s > H_B+H_{BIAS}$, and detection means responsive to the resistance change of said sensing means for detection of said domains.

2. The apparatus of claim 1 wherein said magnetic medium has a stabilizing field directed substantially parallel to the magnetization of said medium and . said stabilizing field has a component parallel to said $H_{BIAS}$ and in flux-linking relationship to said sensing means, when said domain stray field links said sensing means.

3. The apparatus of claim 1 wherein said $H_{BIAS}$ is approximately of the order of said domain stray field.

4. The apparatus of claim 1 wherein said sensing means includes a magneto-resistive sensing element whose resistance is proportional to the magnitude of the magnetic flux linking it, and electrical means for supplying an electrical current through said sensing element.

5. The apparatus of claim 4 wherein said sensing element is a portion of said propagation means.

6. The apparatus of claim 4 wherein said sensing element has a length in the direction of propagation of said domains which is approximately equal to the diameter of said domains.

* * * * *